(12) United States Patent
Linne et al.

(10) Patent No.: US 8,904,203 B2
(45) Date of Patent: Dec. 2, 2014

(54) POWER SUPPLY ASSEMBLY FOR A TERMINAL HAVING ETHERNET ENERGY SUPPLY OPERATING IN PLURALITY OF OPERATING MODES UNDER THE CONTROL OF LOGIC UNIT WITH ONE DC/DC CONVERTER

(75) Inventors: Johannes Linne, Todtenweis (DE); Rudolf Häußermann, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 298 days.

(21) Appl. No.: 13/505,812

(22) PCT Filed: Nov. 5, 2010

(86) PCT No.: PCT/EP2010/066943
§ 371 (c)(1),
(2), (4) Date: Jul. 12, 2012

(87) PCT Pub. No.: WO2011/054941
PCT Pub. Date: May 12, 2011

(65) Prior Publication Data
US 2012/0284538 A1    Nov. 8, 2012

(30) Foreign Application Priority Data
Nov. 6, 2009 (DE) .......................... 10 2009 052 157

(51) Int. Cl.
G06F 1/00 (2006.01)
H02J 1/08 (2006.01)
H04L 12/10 (2006.01)
H04L 12/40 (2006.01)
G06F 1/32 (2006.01)
H02J 1/00 (2006.01)

(52) U.S. Cl.
CPC . *H02J 1/08* (2013.01); *H04L 12/10* (2013.01); *H04L 12/40045* (2013.01); *G06F 1/3203* (2013.01); *H02J 2001/008* (2013.01)
USPC ........................................................ 713/300

(58) Field of Classification Search
CPC .................................................... G06F 1/3203
See application file for complete search history.

(56) References Cited

U.S. PATENT DOCUMENTS

| | | | |
|---|---|---|---|
| 7,187,563 B1 * | 3/2007 | Bobrek | 363/21.01 |
| 7,468,567 B1 * | 12/2008 | Yeh | 307/80 |
| 8,132,029 B2 | 3/2012 | Alms et al. | |
| 2006/0242458 A1 | 10/2006 | Feldman et al. | |

(Continued)

FOREIGN PATENT DOCUMENTS

| | | |
|---|---|---|
| DE | 10 2006 034 422 A1 | 1/2008 |
| EP | 1 942 600 A1 | 7/2008 |

*Primary Examiner* — Thomas Lee
*Assistant Examiner* — Gayathri Sampath
(74) *Attorney, Agent, or Firm* — DLA Piper LLP (US)

(57) ABSTRACT

A power supply assembly for a terminal having Ethernet energy supply, includes a split device with an Ethernet energy supply connection (A1) that connects to an Ethernet cable which is set up to supply energy and with an output to provide a first DC voltage (U1), a logic unit coupled to the split device, a DC/DC converter coupled to the logic unit and connected to the output of the split device in a switchable manner, and a voltage (U) that supplies the terminal being provided at an output of the DC/DC converter under control of the logic unit.

9 Claims, 2 Drawing Sheets

(56) References Cited

U.S. PATENT DOCUMENTS

| | | | |
|---|---|---|---|
| 2008/0168283 A1* | 7/2008 | Penning | 713/310 |
| 2008/0235523 A1* | 9/2008 | Hussain | 713/300 |
| 2008/0250255 A1 | 10/2008 | Diab | |
| 2008/0290729 A1 | 11/2008 | Schoenberg et al. | |
| 2009/0039709 A1* | 2/2009 | Wang et al. | 307/80 |

* cited by examiner

POWER SUPPLY ASSEMBLY FOR A TERMINAL HAVING ETHERNET ENERGY SUPPLY OPERATING IN PLURALITY OF OPERATING MODES UNDER THE CONTROL OF LOGIC UNIT WITH ONE DC/DC CONVERTER

RELATED APPLICATIONS

This is a §371 of International Application No. PCT/EP2010/066943, with an international filing date of Nov. 5, 2010 (WO 2011/054941, published May 12, 2011), which claims the priority of German Patent Application No. 102009052157.7, filed Nov. 6, 2009, the entire contents of which are hereby incorporated by reference.

TECHNICAL FIELD

This disclosure relates to a power supply assembly for a terminal having Ethernet energy supply.

BACKGROUND

Attempts are currently being made to also supply devices connected to a data network with energy via the data network. A conventional standard for this purpose is, for example, IEEE 802.3 of for the so-called Power over Ethernet. In the case of "Power over" Ethernet, network-compatible devices are supplied with energy via the eight-wire Ethernet cable. One advantage of Power over Ethernet is that it is possible to dispense with a power supply cable in the device.

To expand a terminal with Power over Ethernet functionality, a so-called "splitter" is usually installed in a conventional Ethernet-compatible terminal. This splitter separates the energy provided via the Ethernet cable from the data. The splitter thus generates a DC voltage and provides the Ethernet signal. In this case, the DC voltage is in a region of 50 V according to the standard. Consequently, this DC voltage must then be converted into a supply voltage of 3 to 12 V, for example, which is typically conventional for terminals. This increases the complexity, costs, susceptibility to faults, weight and area and space requirement of the power supply in the terminal.

Therefore, it could be helpful to further improve a power supply for terminals having Ethernet energy supply.

SUMMARY

We provide a power supply assembly for a terminal having Ethernet energy supply, including a split device with an Ethernet energy supply connection (A1) that connects to an Ethernet cable which is set up to supply energy and with an output to provide a first DC voltage (U1), a logic unit coupled to the split device, a DC/DC converter coupled to the logic unit and connected to the output of the split device in a switchable manner, and a voltage (U) that supplies the terminal being provided at an output of the DC/DC converter under control of the logic unit.

LIST OF REFERENCE SYMBOLS

Figure 1:
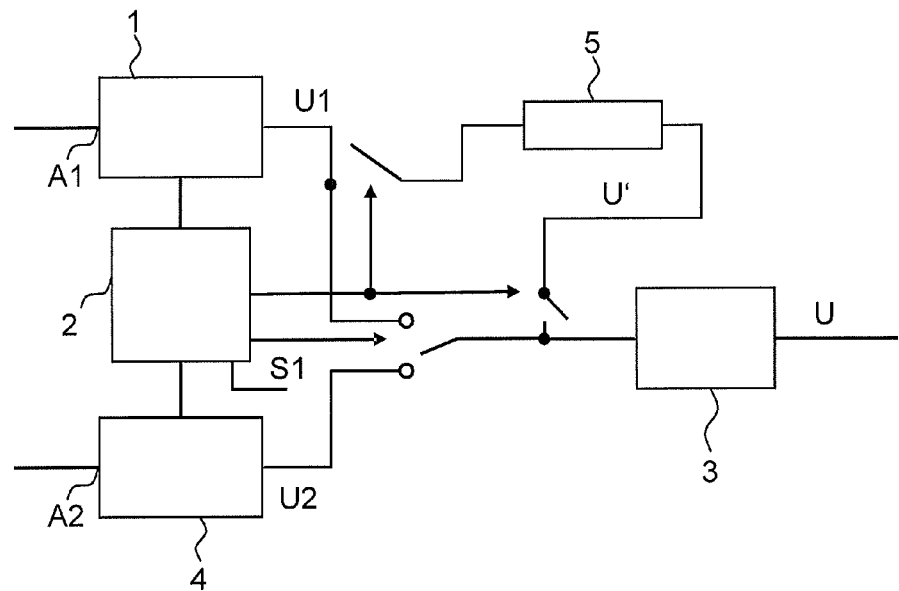
FIG. 1 schematically shows an example of a power supply assembly for a terminal having Ethernet energy supply.

1 Split device
2 Logic unit
3 DC/DC converter
4 Power supply unit
5 Energy store
6 DC isolation
A, B Switch position
A1, A2 Connection
U1, U2 DC voltage
U, U' Voltage
U1', U2' Auxiliary voltage
Rx, Tx Wire pair
S1 Status signal
SH, SL Signal
SW Switch
SP Flyback converter
SL, SH Signal
T1, T2 Transistor
V Voltage comparator

DETAILED DESCRIPTION

Our power supply assembly for a terminal having Ethernet energy supply may comprise a split device, a logic unit coupled to the split device and a DC/DC converter coupled to the logic unit. The split device comprises an Ethernet energy supply connection to connect to an Ethernet cable which is set up to supply energy and an output to provide a first DC voltage. The DC/DC converter also connects to the output of the split device in a switchable manner. A voltage for supplying the terminal is provided at an output of the DC/DC converter under the control of the logic unit.

Energy is supplied to the terminal via the Ethernet cable and is provided by the split device in the form of a first DC voltage. The first DC voltage is supplied to the DC/DC converter via a connection switched by the logic unit and converted into the voltage. In this case, the logic unit controls both the split device and the DC/DC converter.

The power supply for the terminal is controlled on account of the assembly with the common control of the split device and the DC/DC converter. The methods of operation of the DC/DC converter and the split device are adjusted to one another, with the result that a lower failure rate, that is to say a higher mean time between failure, MTBF, is achieved.

The split device is also referred to as a splitter in the sense of the Power over Ethernet standard. It therefore also performs other functions provided in the standard, for example, signaling and negotiation of the power class with a Power over Ethernet infrastructure.

The power supply assembly may have a power supply unit coupled to the logic unit. The power supply unit comprises an output to provide a second DC voltage. This output connects to the DC/DC converter in a switchable manner.

The first DC voltage provided by the split device or the second DC voltage provided by the power supply unit is respectively supplied to the DC/DC converter under the control of the logic unit via a switchable connection. The DC/DC converter generates the voltage for the terminal therefrom.

The complexity of the power supply and its area and space requirement are advantageously reduced by integrating the two energy supplies present in a parallel manner in the terminal, namely the power supply unit and the split device, with the aid of the logic unit and the only one DC/DC converter. As a result of the fact that only one DC/DC converter is used, it is only necessary to provide this one DC/DC converter with stabilization and temperature and ageing compensation.

The power supply unit comprises, for example, a power supply unit—already present in a terminal—of a monitor which is supplied with an AC voltage in the region of 110 V or 220 V. The first DC voltage usually provided by the split device is of the order of magnitude of 50 V, for example. The second DC voltage typically provided by the power supply unit is in the range of 100 to 200 V, for example. The DC/DC converter is consequently configured such that it covers an input voltage range of 50 to 200 V, for example.

The power supply assembly may be designed for operation in a first operating mode and in a second operating mode under the control of the logic unit as a function of a respective value of the first and second DC voltages.

The first and second DC voltages are supplied to the logic unit. Depending on the respective value of the first and second DC voltages provided, the logic unit controls the power supply assembly into the first operating mode or into the second operating mode.

The first DC voltage may be supplied to the DC/DC converter in the first operating mode and the voltage may be provided on the basis of the first DC voltage. The second DC voltage may be supplied to the DC/DC converter in the second operating mode and the voltage may be provided on the basis of the second DC voltage.

In the first operating mode, the switchable connection between the split device and the DC/DC converter is closed under the control of the logic unit, with the result that the terminal is supplied with energy via the split device, that is to say by Power over Ethernet. The DC/DC converter converts the first DC voltage into the voltage for the terminal. In the second operating mode, the switchable connection between the power supply unit and the DC/DC converter is closed under the control of the logic unit. The terminal is consequently supplied with energy via the power supply unit. The DC/DC converter generates the voltage for the terminal from the second DC voltage.

Selecting the operating mode advantageously makes it possible to set whether the terminal is supplied via the power supply unit or via the split device. The combined control of the power supply unit and the split device via the logic unit enables a control of the so-called "power management." The control function to be performed in the logic unit is considerably simplified because only one DC/DC converter needs to be controlled. Furthermore, in the second operating mode, that is to say when the terminal is being supplied via the power supply unit, it is possible to disconnect the energy supply via the split device and thus to relieve the load on the infrastructure, for example, a Power over Ethernet injector.

DC isolation may respectively be provided between the split device and the DC/DC converter and further DC isolation may be provided between the power supply unit and the DC/DC converter.

The logic unit may have a voltage comparator.

The voltage comparator compares the first or second supplied DC voltage with a minimum voltage. The comparison result is used to select the operating mode.

The power supply assembly may have an energy store. The latter is coupled between the split device and the DC/DC converter in a switchable manner.

The energy store is charged in phases in which the terminal requires less energy than is supplied via the Ethernet cable. In phases in which the terminal requires more energy than is supplied via the Ethernet cable, the energy store provides additional energy.

The energy store thus advantageously acts as a buffer and enables more efficient use of the consumption classes defined in the IEEE standard 802.3 af.

The power supply assembly may be designed for operation in a third operating mode and in a fourth operating mode under the control of the logic unit.

The energy store may be connected to the output of the split device in the third operating mode to be charged with the first DC voltage. The energy store connects to the input of the DC/DC converter in the fourth operating mode to provide an additional voltage.

As soon as the logic unit realizes that the terminal requires less energy than is provided via the Ethernet cable, it controls the power supply assembly into the third operating mode. The energy store is charged. On the other hand, if the logic unit realizes that the terminal requires more energy than can be supplied via the Ethernet cable, it controls the power supply assembly into the fourth operating mode. Consequently, the energy store provides the additional voltage which is supplied to the DC/DC converter in addition to the first DC voltage.

It is thus possible to flexibly react to the energy requirement of a terminal which differs over the operating time.

In this case, the energy store is realized, for example, in the form of a rechargeable battery, in particular a lithium polymer rechargeable battery.

A status signal may be provided at an output of the logic unit on the basis of the voltage.

The status signal comprises, for example, information stating that the power supply assembly is in operation or an indication of the currently active operating mode.

Our power supply assemblies may be explained in more detail below using examples with reference to the figures. Functional elements having the same function or effect have the same reference symbols. Insofar as elements correspond in terms of their function, the description of those elements is not repeated in each of the subsequent figures.

FIG. 1 shows an example of our power supply assembly. The assembly comprises a split device 1, a logic unit 2, a DC/DC converter 3 and a power supply unit 4. The split device 1 has an energy supply connection A1 for connection to an Ethernet cable. The Ethernet cable is set up to supply energy via a Power over Ethernet infrastructure. A first DC voltage U1 is provided at the output of the split device 1. The logic unit 2 is coupled to the split device 1, the DC/DC converter 3 and the power supply unit 4. The power supply unit 4 has a connection A2 that connects to a 110 V or 220 V AC mains. A second DC voltage U2 is provided at an output of the power supply unit 4. The first DC voltage U1 and the second DC voltage U2 are each supplied to an input of the DC/DC converter 3 via a switchable connection. The switchable connections are each controlled by the logic unit 2. A voltage U for the terminal is provided at an output of the DC/DC converter 3.

The logic unit 2 controls operation of the power supply assembly in a first operating mode or in a second operating mode. In the first operating mode, the switchable connection between the split device 1 and the DC/DC converter 3 is closed, with the result that the first DC voltage U1 is supplied to the input of the DC/DC converter. The DC/DC converter 3 generates the voltage U for the terminal from the first DC voltage U1. In the second operating mode, the switchable connection between the power supply unit 4 and the DC/DC converter 3 is closed under the control of the logic unit 2. The second DC voltage U2 is thus supplied to the DC/DC converter 3, from which DC voltage the DC/DC converter 3 generates the voltage U.

The first DC voltage U1 is in the region of 50 V, for example. The second DC voltage U2 is in the range of 100 to 200 V, for example. The voltage U is provided in the range of 3 to 12 V, for example.

Integration of the split device 1 and the power supply unit 4 under the control of the logic unit 2 advantageously enables implementation with precisely one DC/DC converter 3. Selecting the first or second operating mode provides the power supply with a greater degree of flexibility. In addition, it is also possible for the infrastructure to control the Power over Ethernet power supply on the basis of evaluation of a status signal S1 provided by the logic unit 2 and corresponding signaling by the split device 1.

An energy store 5 may additionally be provided. The energy store is coupled, on the one hand, to the output of the split device 1 and, on the other hand, to the input of the DC/DC converter 3 in a switchable manner under the control of the logic unit 2. The energy store 5 is set up to provide an additional voltage U'. This construction of the power supply assembly is implemented without the power supply unit 4.

When using the energy store 5, the power supply assembly can be operated in a third operating mode and in a fourth operating mode under the control of the logic unit 2. In the third operating mode, a switchable connection between the energy store 5 and the split device 1 is closed. The energy store 5 is thus charged with the first DC voltage U1. In the fourth operating mode, the switchable connection between the energy store 5 and the DC/DC converter 3 is closed. The additional voltage U' is additionally supplied to the input of the DC/DC converter 3.

The current Power over Ethernet standards stipulate an upper limit for the total power consumption of a terminal. Depending on the standard, a consumption class oriented to the energy consumption of the terminal is agreed with the infrastructure when initializing the Power over Ethernet terminal. However, the energy requirement of a terminal may vary, in particular as a result of the use of further peripherals, and may consequently increase considerably.

15 W, for example, are typically provided via the Power over Ethernet infrastructure. If the terminal requires less than these 15 W for example, the logic unit 2 controls the terminal into the third operating mode in which the energy store 5 is charged with the energy which is not required by the terminal.

In the contrary case in which the terminal requires more energy than is supplied via the energy supply connection A1, the logic unit 2 controls the power supply assembly into the fourth operating mode. The energy store 5 then delivers the additional voltage U'.

Brief peaks in the energy requirement of a terminal and the medium-term operation of a terminal with peripherals can thus be advantageously implemented on a standard Power over Ethernet infrastructure.

It is also possible to implement, under control of the logic unit 2 and on the basis of evaluation of the status signal S1, corresponding signaling with respect to the Power over Ethernet infrastructure, for example, at a so-called "power injector," with the result that operation can also be controlled on the main side.

Figure 2:
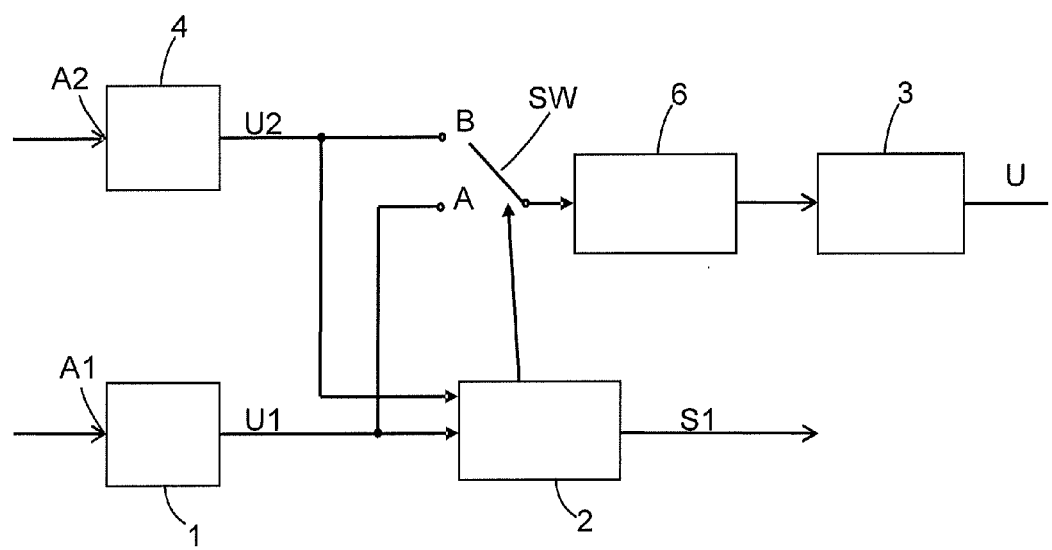
FIG. 2 schematically shows an example of a power supply assembly.

FIG. 2 shows another example of a power supply assembly. In addition to the example from FIG. 1, the example shown here has a switch SW and a DC-isolation unit 6. The DC-isolation unit 6 DC-isolates the DC/DC converter 3 both from the split device 1 and the power supply unit 4. The switch SW is controlled by the logic unit 2 and switches over the input of the DC/DC converter 3 between the first DC voltage U1 and the second DC voltage U2. If the switch SW is in the position A, the power supply assembly is in the first operating mode and is supplied via the split device 1 and the first DC voltage U1. In contrast, if the switch SW is in the position B, the power supply assembly is in the second operating mode and is supplied via the power supply unit 4 and the second DC voltage U2.

In this case, the power supply unit 4 comprises at least one rectifier to convert AC voltage into DC voltage. The split device 1 supports both polarities of the voltage supplied via the Ethernet cable. The switch SW is preferably implemented in the form of a relay.

The logic unit 2 is configured, for example, such that it switches the power supply assembly into the second operating mode when the second DC voltage U2 is present and as soon as a value of the second DC voltage U2 exceeds a minimum voltage value. This advantageously relieves the load on the Power over Ethernet infrastructure.

If either the first DC voltage U1 or the second DC voltage U2 is provided according to its respective specification, the status signal S1 indicates that the power supply assembly is operating.

Figure 3:
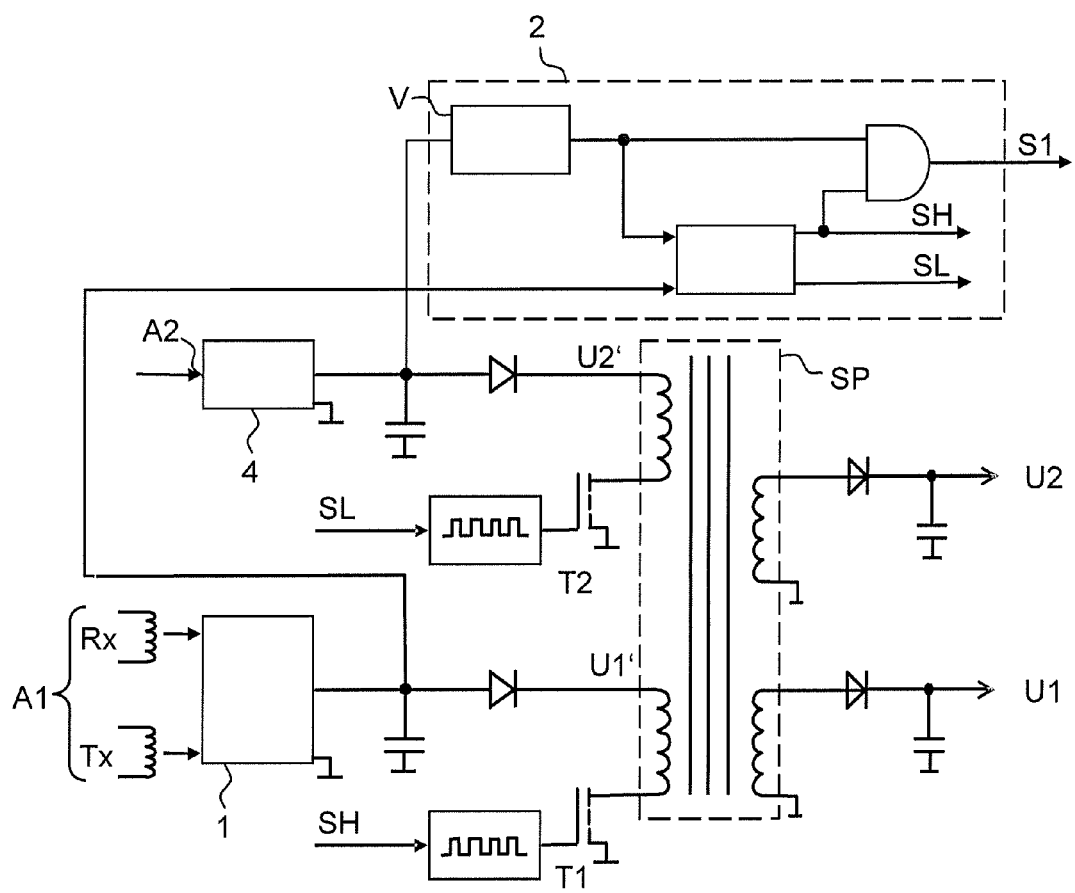
FIG. 3 schematically shows an example of apparatus providing the first and second DC voltages.

FIG. 3 shows an example that provides the first and second DC voltages. In this case, a different type of DC isolation between the energy supply and the energy provision in the terminal is shown. The DC isolation is implemented here, by way of example, with the aid of a flyback converter SP. The voltage supplied to the energy supply connection A1, here in the form of a wire pair Rx, Tx of an Ethernet cable, is converted into a first auxiliary voltage U1' in the split device 1. The AC voltage supplied to the second connection A2 is rectified in the power supply unit 4 and is provided as a second auxiliary voltage U2'.

A voltage comparator V of the logic unit 2 compares the supplied second auxiliary voltage U2' with a minimum voltage. If the second auxiliary voltage U2' is greater than the minimum voltage, the logic unit 2 generates a signal SL. As a result, the second auxiliary voltage U2' is switched to the primary winding of the flyback converter SP under the control of a transistor T2. The second DC voltage U2 is provided at the output of the flyback converter SP. The terminal is in the second operating mode and is thus supplied via the power supply unit 4.

If the second auxiliary voltage U2' is less than the minimum voltage, the logic unit 2 generates a control signal SH. A transistor T1 is consequently turned on and the first auxiliary voltage U1' is switched to the primary winding of the flyback converter SP. The first DC voltage U1 is provided at the output of the flyback converter SP.

Both the first and second DC voltages U1, U2 are each supplied to a DC/DC converter 3 from FIG. 1 or 2.

The invention claimed is:

1. A power supply assembly for a terminal having Ethernet energy supply, comprising:

A split device with an Ethernet energy supply connection (A1) that connects to an Ethernet cable which is set up to supply energy and with an output to provide a first DC voltage (U1), a logic unit coupled to the split device, a DC/DC converter coupled to the logic unit and connected to the output of the split device in a switchable manner, a power supply unit coupled to the logic unit, and the power supply unit having an output that provides a second DC voltage (U2) and connects to the DC/DC converter in a switchable manner, an energy store coupled between the split device and the DC/DC converter in a switchable manner, a voltage (U) that supplies the terminal being provided at an output of the DC/DC converter under control of the logic unit, wherein the power supply assembly operates in a first operating mode and in a second operating mode under control of the logic unit as a function of a respective value of the first and second DC voltages (U1, U2), wherein the power supply assembly operates in a third operating mode and in a fourth operating mode under control of the logic unit.

2. The power supply assembly according to claim 1, wherein the first DC voltage (U1) is supplied to the DC/DC converter in the first operating mode and the voltage (U) is provided depending on the first DC voltage (U1), and the second DC voltage (U2) is supplied to the DC/DC converter in the second operating mode and the voltage (U) is provided depending on the second DC voltage (U2).

3. The power supply assembly according to claim 1, further comprising DC isolation, respectively, between the split device and the DC/DC converter and between the power supply unit and the DC/DC converter.

4. The power supply assembly according to claim 1, wherein the logic unit has a voltage comparator (V).

5. The power supply assembly according to claim 1, wherein the energy store connects to the output of the split device in the third operating mode to be charged with the first DC voltage (U1), and the energy store connects to the input of the DC/DC converter in the fourth operating mode in order to provide an additional voltage (U').

6. The power supply assembly according to claim 1, wherein a status signal (S1) is provided at an output of the logic unit depending on the voltage (U).

7. The power supply assembly according to claim 2, further comprising DC isolation, respectively, between the split device and the DC/DC converter and between the power supply unit and the DC/DC converter.

8. The power supply assembly according to claim 2, wherein the logic unit has a voltage comparator (V).

9. The power supply assembly according to claim 3, wherein the logic unit has a voltage comparator (V).

* * * * *